No. 648,417. Patented May 1, 1900.
F. LEINEWEBER & C. WELGE.
BALING PRESS.
(Application filed Sept. 29, 1899.)
(No Model.) 2 Sheets—Sheet 1.
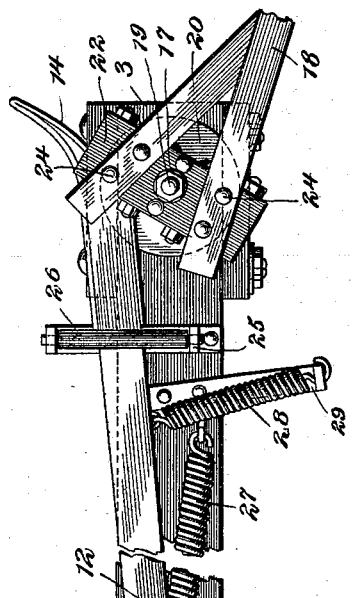
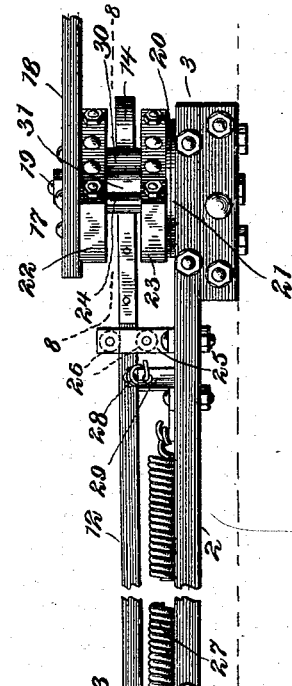
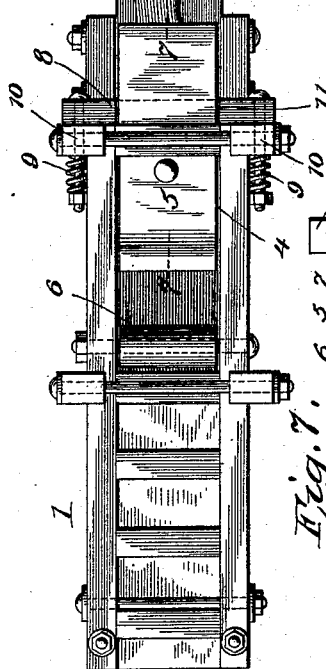
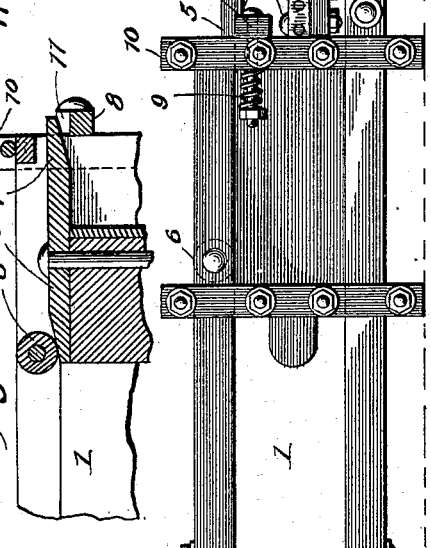
Witnesses
Howard D. Orr.
Inventors,
Francis Leineweber
Charles Welge.
By their Attorneys,
C. A. Snow & Co.
THE NORRIS PETERS CO., PHOTO-LITHO., WASHINGTON, D. C.

No. 648,417. Patented May 1, 1900.
F. LEINEWEBER & C. WELGE.
BALING PRESS.
(Application filed Sept. 29, 1899.)
(No Model.) 2 Sheets—Sheet 2.
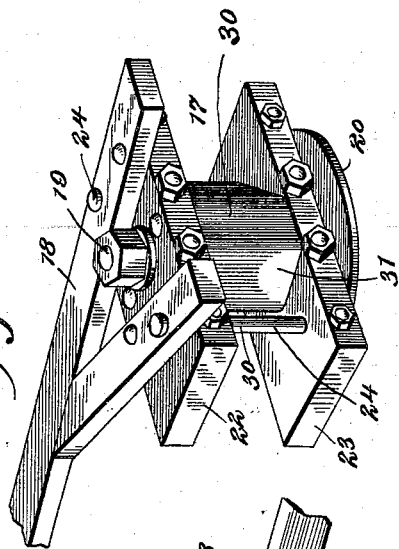
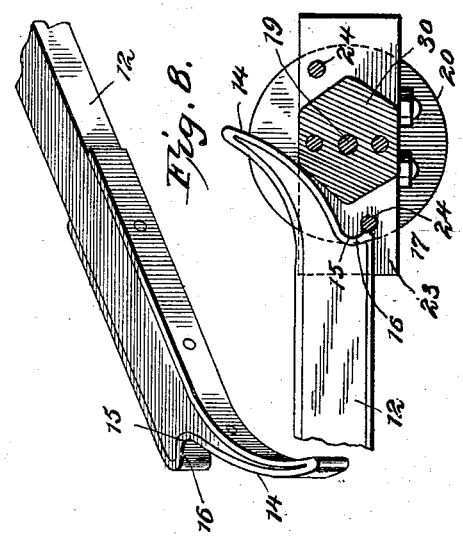
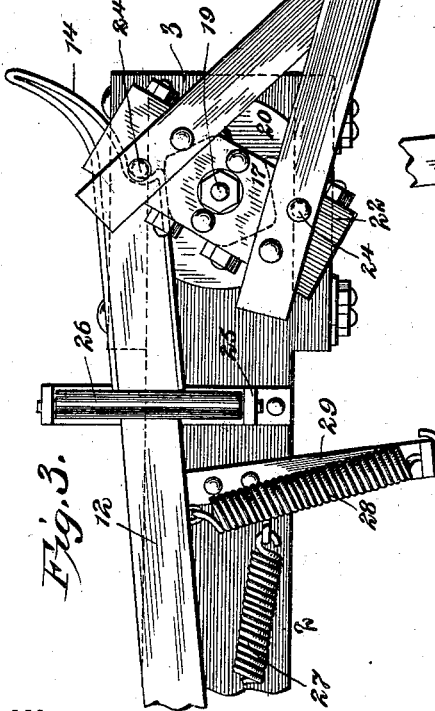
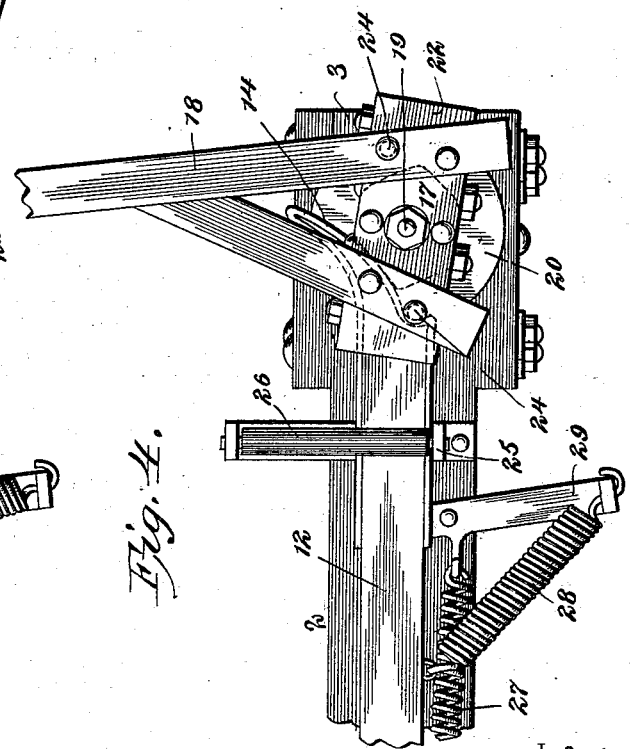
Witnesses
Howard D. Orr
Inventors
Francis Leineweber
Charles Welge
By their Attorneys,
C. A. Snow & Co.

UNITED STATES PATENT OFFICE.

FRANCIS LEINEWEBER AND CHARLES WELGE, OF SAN MARCOS, TEXAS.

BALING-PRESS.

SPECIFICATION forming part of Letters Patent No. 648,417, dated May 1, 1900.

Application filed September 29, 1899. Serial No. 732,104. (No model.)

*To all whom it may concern:*

Be it known that we, FRANCIS LEINEWEBER and CHARLES WELGE, citizens of the United States, residing at San Marcos, in the county of Hays and State of Texas, have invented a new and useful Baling-Press, of which the following is a specification.

Our invention relates to improvements in hay-presses of the full circle or continuous type for baling hay, straw, and the like.

The object of the invention, considered in its specific aspect, is the production of a positive trip connection between the power-head and pitman which will exert a powerful leverage during the termination of the stroke and will cause the prompt release of the pitman from the power-head when the plunger has reached the limit of its stroke.

A further and subordinate object is a novel arrangement of the buffer-head and of various structural details throughout the device.

Referring to the drawings, Figure 1 is a plan view of our press complete. Fig. 2 is a side elevation thereof. Fig. 3 is a plan view of the outer end of the tongue, the power-head, and a portion of the pitman, hidden parts being shown in dotted lines. Fig. 4 is a similar view with the pitman at one limit of its stroke and in the act of being tripped. Fig. 5 is a detail view of the power-head, and Fig. 6 is a detail view of the end of the pitman. Fig. 7 is a detail longitudinal section on the plane of the line 7 7 of Fig. 1, illustrating the means for arresting the movement of the plunger at the limits of its travel in either direction. Fig. 8 is a detail horizontal section through the power-head and the cam-formed end of the pitman, the plane of the section being indicated by the dotted line 8 8 of Fig. 2.

Referring to the numerals on the drawings, 1 indicates the baling-chamber of a hay-press constructed substantially in the ordinary manner, and 2 the beam or tongue connecting the baling-chamber with the power-platform 3, which supports the power mechanism of the press.

4 indicates the plunger, movable within the press, to the top of which is bolted a guide and stop-plate 5, beveled at its front end (see Fig. 6) to permit an increasing frictional contact with a transverse stop-roller 6, mounted between the sides of the baling-press and having its opposite end 7 extended over a buffer-head 8, carried by spring-retracted bolts 9, passing through the front standard 10 of the baling-chamber. As the plunger is thrown forward in a manner to be described the beveled ends of the plate 5 is presented to the roller 6 at the limit of its stroke, constituting a gradually-applied stop calculated to limit the stroke of the plunger without undue jar when the press is empty or practically so. As the plunger is violently retracted by the action of the spring which imparts the rebounding movement to said plunger the shock is relieved by the engagement of the stop-plate with the buffer-head within a recess 11, in which the extended end 7 of the plate 5, which is beveled on its under side, is designed to be received.

12 indicates the pitman, pivotally connected to a projection 13, extending from the rear end of the plunger. The opposite or free end of this pitman is formed with a cam 14, extending from about the center line of the pitman and terminating at its inner end in a concavity 15 intermediate of the cam 14 and a short cam-face 16, terminating at the edge of the pitman adjacent to the power mechanism. This power mechanism in presses of this class comprises a power-head 17, designed to effect the reciprocation of the pitman and to be operated by a sweep 18, continuously movable in a circular path. The power-head 17 is mounted upon a vertical shaft 19, extending upwardly from the power-plate, and it is preferably provided on its under side with a bearing-disk 20, revoluble against the face of a similar disk 21, supported at the extremity of the beam. The power-head proper is composed of head-plates 22 and 23, intermediate of which extend actuating-pins 24, located adjacent to the opposite ends of the head-plate and preferably contiguous to the opposite sides thereof. As the head is rotated one of the pins 24 is presented to the concavity 15 and the pitman is urged in a direction to cause the reciprocation of the plunger;

but the continued rotation of the free end of the pitman with the power-head of the sweep is arrested by the disengagement of the pitman from the pin, which disengagement of the parts is due to a tripping-cam 30 of the power-head riding against the cam-face 14 of the pitman at the instant that the lateral movement of the pitman is arrested by one of the frame-bars 25, which supports the rollers 26, said frame-bars and the rollers thus constituting the roller-frame in which the pitman is free to have an endwise movement and a limited lateral movement.

The utility of the short cam-face 16, extending from the concavity 15, is readily apparent, since its general direction is tangential to the circular path described by the actuating-pins. Therefore, as the lateral movement of the pitman necessary to accommodate the movement of the engaged locking-pin is arrested by the roller-frame continued movement of the sweep will cause the pin to advance along the cam-face 16, and the most powerful leverage will thereby be exerted to drive the plunger under an enormous pressure through the final fraction of its stroke.

As shown by Fig. 1 of the drawings, one side of the roller-table lies in a position nearly in line with a plane which bisects the axis of the revoluble power-head and the pitman, and this side of the frame provides a stop-surface which is disposed in the path of the pitman, the latter being adapted to abut or press against said side of the stop-frame when it is moved in a segmental path by engagement of a driving-pin on the power-head with the seat in the end face of the pitman. This arrangement of the roller-frame serves to arrest the travel of the pitman with the power-head at a period when the driving-pin of the revoluble head reaches a position to ride upon the short abrupt cam-surface 16 at the end of the pitman, and the stop-surface on said roller-frame thus coacts with the pitman and through the latter with the power-head in a manner to assist the driving element of the power-head in riding against the abrupt short cam-surface 16, so as to give the final compression thrust to the pitman and the plunger.

The forward movement of the plunger is at all times resisted by a powerful plunger-retracting spring 27, connected at one end to the beam 2 and at its opposite end to the pitman 12, adjacent to the connecting of the latter with the plunger. 28 indicates a second spring designed to exert a constant pressure on the pitman to draw the latter at all times in the direction of the power-head, one of its ends being preferably connected to a lateral frame 29 and its opposite end to the side of the pitman. Ordinarily the resistance of the retracting-spring is so considerable that when the shaft of the power-head, the engaged actuating-pin, and the contacting face of the pitman extremity are in alinement there is danger of binding the parts, especially as the highly-compressed bale also exerts a pressure upon the plunger. To overcome this tendency, we have devised the positive trip mechanism, which comprises the cam-face 14, extending from the end of the pitman, and a pair of tripping-cams 30, formed upon a cam-block 31, mounted upon the shaft between the head-plates 22 and 23.

Having described the structural features of our invention, it may be well to briefly outline the operation thereof in order that the functions of the several parts and the utility of their special arrangement may be properly comprehended.

The baling-chamber having been filled with the material to be baled and the power, of whatever form, having been applied to the sweep, the power-head is rotated and one of the actuating-pins is presented to the concavity 15 at the end of the pitman. The pitman will now move forward as the pin advances and will swing under the tension of the spring 27 to make the free end of the pitman travel in an arc-shaped path described by the movement of the actuating-pin on the power-head, while said power-head pin and the pitman remain in engagement one with the other. As the pin approaches the longitudinal center of movement of the plunger further lateral movement of the pitman will be prevented by its contact with one side of the roller-frame and the pin thereafter advancing along the short cam-face 16 of the now laterally-immovable pitman will force the latter to move longitudinally under great pressure, as already described. As the pin approaches the end of the face 16 the tripping-cam which follows after the pin is brought into contact with the cam-face 14, and as said tripping-cam continues to advance on said cam-face 14 the pitman is forced laterally against the tension of the spring 27, said tripping-cam thereby effecting the disengagement of the actuating-pin from the pitman. The retracting-springs will now restore the plunger and pitman to their normal positions, and the next operation of these parts will be effected by the pin and cam located at the side of the power-head opposite the corresponding elements whose operation has just been described. As the plunger is advanced or forced in a forward direction by an actuating-pin 24 of the power-head engaging with the notched and cam-formed extremity of the pitman 12 the beveled front end of the stop-plate 5 on the plunger is forced below the roll 6, which serves to limit, in a measure, the forward movement of the plunger and to effect the folding of the material which is being fed into the baling-chamber, said plate 5 also cutting off the feed of the material. As the power-head continues to rotate and the notched and cam-formed end of the pitman is disengaged from the actuating-pin of said power-head by the action of the tripping-cam the spring 27 reacts to retract the rebounding plunger suddenly. During this rebounding movement of the plunger the beveled rear end 7 of the stop-plate 5 rides against the buffer-head 8, the springs 9 of which buffer-head are arranged to resist the travel of the buffer-head with the stop-plate of the rebounding plunger. Hence the buffer-head operates to check and retard the rebounding movement of the plunger and finally to arrest the same, so as to reduce the jar and shock of the working elements of the press.

From the foregoing it will appear that we have devised a simple, powerful, and positively-acting hay-press; but while the present embodiment appears at this time to be preferable we do not desire to limit ourselves to the structural details illustrated and described, but reserve the right to change, modify, or vary such details within the scope of the protection prayed.

What we claim is—

1. In a baling-press, the combination with a baling-chamber, a rebounding plunger and a spring-actuated pitman pivoted to the plunger, of a concavity opening toward the end of the pitman and having one side terminating in a cam-face, a power-head and actuating-pins and intermediate tripping-cams carried by the power-head and arranged respectively to engage the concavity and terminal cam alternately, whereby the pitman is reciprocated by the actuating-pins and is positively tripped through the operation of the tripping-cams, substantially as specified.

2. In a baling-press, a pitman having a seat and cam-surfaces curved reversely to each other, in combination with a power-head having an actuating element and a tripping-surface disposed for engagement successively with the seat and a cam-surface of the pitman, for the purpose described, substantially as set forth.

3. In a baling-press, a pitman provided at its free end with a seat, a short cam-surface on one side of the seat and an elongated cam-surface on the opposite side of the seat, combined with a power-head provided with a driving element and with a cam tripping-surface, said driving element of the power-head arranged for engagement with the seat and short cam-surface of the pitman, and the cam tripping-surface adapted to subsequently engage with the elongated cam-surface of the pitman for deflecting the latter positively and disengaging the short cam-surface thereof from the driving element of the power-head, substantially as described.

4. In a baling-press, a pitman provided with a seat and with a cam-surface on one side of the seat, in combination with a power-head having a driving element arranged to engage successively with the seat and the cam-surface of the pitman to impart the final forward thrust to the pitman, and means for positively effecting the disengagement of the driving element from the cam-surface of the pitman by a lateral movement of the pitman, substantially as described.

5. In a baling-press, the combination with a rebounding plunger, of a pitman connected pivotally therewith and provided at its free end with a compression-cam and a releasing-cam disposed on opposite sides of a seat, a revoluble power-head having driving elements and tripping-cams arranged alternately and adapted for successive engagement with the compression-cam and the releasing-cam of said pitman, means for maintaining the cam-formed end of said pitman normally in the path of or engagement with said power-head, and means to arrest the lateral or transverse travel of the pitman under the revoluble action of the driving elements of said power-head, substantially as described.

6. In a baling-press, a power-head provided with driving-pins and tripping-cams alternating with the driving-pins and movable in paths eccentric to the rotary path described by said pins, in combination with a rebounding plunger, a pitman connected pivotally with said plunger and provided with the compression and releasing cams on opposite sides of a pin-seat therein, and means for holding said cam-formed end of the pitman normally in the path of the power-head, substantially as described.

7. In a baling-press, the combination with a rebounding plunger, of a pitman connected therewith and provided at its free extremity with the compression and releasing cams disposed on opposite sides of a seat, a revoluble power-head having the alternately-disposed driving elements and the trip-cams arranged to engage successively with the compression and releasing cams of said pitman, a spring connected with the plunger to impart the rebounding action thereto, and a spring inclined to the axis of the pitman and connected therewith for imparting a lateral travel to the pitman and holding the cam-formed end thereof normally in the path of the power-head, said springs being separate one from the other and acting on the plunger and the pitman individually, substantially as described.

8. In a baling-press, a rebounding plunger and a pitman connected thereto, said pitman having at its free end a seat and cam-surfaces curved reversely to each other, in combination with a power-head having an actuating element and a tripping-surface disposed for engagement successively with the seat and the reversely-curved surfaces of the pitman, a spring to move said plunger and pitman in one direction, a guide for the pitman, and a spring to impart lateral movement to said pitman, substantially as described.

9. In a baling-press, the combination with a plunger, of a stop-plate movable with said plunger and having an inclined edge, a yieldable buffer-head supported in the path of the inclined edge of said plate, fixed guides on which said buffer-head is slidably fitted for movement in a path parallel to the plunger and springs which resist the travel of the buffer-head with the plate under the rebounding action of the plunger, whereby the plate and the buffer-head coact in arresting the rebound of the plunger, substantially as described.

In testimony that we claim the foregoing as our own we have hereto affixed our signatures in the presence of two witnesses.

FRANCIS LEINEWEBER.
CHAS. WELGE.

Witnesses:
D. L. EDWARDS,
CHAS. HUTCHINGS.